(12) United States Patent
Seo (10) Patent No.: US 10,089,452 B2
(45) Date of Patent: Oct. 2, 2018

(54) THREE-DIMENSIONAL FINGERPRINT SCANNER

(71) Applicant: International Business Machines Corporation, Armonk, NY (US)

(72) Inventor: Hyun Kyu Seo, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/255,487

(22) Filed: Sep. 2, 2016

(65) Prior Publication Data

US 2018/0068100 A1    Mar. 8, 2018

(51) Int. Cl.
G06F 17/30    (2006.01)
G06F 21/32    (2013.01)
G06F 21/62    (2013.01)
G06K 9/00     (2006.01)

(52) U.S. Cl.
CPC .......... *G06F 21/32* (2013.01); *G06F 21/6218* (2013.01); *G06K 9/00013* (2013.01); *G06K 9/00087* (2013.01)

(58) Field of Classification Search
CPC . G06F 21/32; G06F 21/6218; G06K 9/00087; G06K 9/00013
See application file for complete search history.

(56) References Cited

U.S. PATENT DOCUMENTS

| | | | |
|---|---|---|---|
| 5,869,822 A * | 2/1999 | Meadows, II | G06K 9/00067 235/380 |
| 7,609,865 B2 | 10/2009 | Chen | |
| 7,660,442 B2 | 2/2010 | Sweeney et al. | |
| 2001/0040987 A1 * | 11/2001 | Bjorn | G06F 21/32 382/124 |
| 2004/0008875 A1 | 1/2004 | Linares | |
| 2005/0249388 A1 | 11/2005 | Linares | |

(Continued)

FOREIGN PATENT DOCUMENTS

WO    2015005959    4/2014

OTHER PUBLICATIONS

P. Mell et al., "The NIST Definition of Cloud Computing", National Institute of Standards and Technology, Information Technology Laboratory, Sep. 2011, pp. 1-7.

(Continued)

*Primary Examiner* — Mohammed Waliullah
(74) *Attorney, Agent, or Firm* — Law Office of Jim Boice (57) ABSTRACT

A fingerprint scanner includes a fingerprint scanner plate, a rotating platform aligned below the fingerprint scanner plate, a light mounted on the rotating platform, a camera, one or more processors, and a memory device. The camera captures multiple images of shadows in grooves in a fingerprint of a user's finger that is pressed against the fingerprint scanner plate as the light moves on the rotating platform. The one or more processors analyze the multiple images of the shadows in the grooves in the fingerprint to determine a depth and shape of the grooves in the fingerprint, and then generate an original digital fingerprint file that represents the shape and depth of the fingerprint grooves on the user's fingerprint. The processor(s) store the original digital fingerprint file for use in future biometric verification of the user.

17 Claims, 6 Drawing Sheets

(56) References Cited

U.S. PATENT DOCUMENTS

2011/0095863 A1* 4/2011 Laaroussi .......... G07C 9/00563
340/5.7
2012/0269404 A1* 10/2012 Hassebrook ....... G01B 11/2513
382/115
2012/0293642 A1* 11/2012 Berini ..................... G06F 21/32
348/77
2016/0180142 A1* 6/2016 Riddle ............... G06K 9/00033
382/124

OTHER PUBLICATIONS

Anonymous, "Camera & Beam-Based Dynamic Intelligent Fingerprint Recognition Method in Payment System", ip.com, Aug. 4, 2015, IPCOM000242693D.

Panickar, A., "Method and System for Webcam Based Fingerprinting for Authentication/Signing", ip.com, May 7, 2012, IPCOM000217303D.

Anonymous, "Weight Quantification Model in the Feature Space for Biometric Evidence", Yahoo! 2012, ip.com, Nov. 5, 2015, IPCOM000244031D.

Diaz, Jesus, "This Is the Oldest Record in History—Scanned and Recreated From a Photo", gizmodo.com, Jun. 29, 2015. <http://gizmodo.com/5922410/this-is-the-oldest-vinyl-album-in-the-history-of-the-world>.

* cited by examiner

ND FINGERPRINT
THREE-DIMENSIONAL FINGERPRINT SCANNER

BACKGROUND

The present disclosure relates to the field of computers, and particularly to computers that utilize biometric scanners. Still more particularly, the present disclosure relates to fingerprint scanners.

SUMMARY

In an embodiment of the present invention, a fingerprint scanner includes a fingerprint scanner plate, a rotating platform aligned below the fingerprint scanner plate, a light mounted on the rotating platform, a camera, one or more processors, and a memory device. The camera captures multiple images of shadows in grooves in a fingerprint of a user's finger that is pressed against the fingerprint scanner plate as the light moves on the rotating platform. The one or more processors analyze the multiple images of the shadows in the grooves in the fingerprint to determine a depth and shape of the grooves in the fingerprint, and then generate an original digital fingerprint file that represents the shape and depth of the fingerprint grooves on the user's fingerprint. The processor(s) store the original digital fingerprint file for use in future biometric verification of the user.

In an embodiment of the present invention, one or more processors and/or other hardware devices generate a three-dimensional (3D) image of a fingerprint. One or more sensors detect a user's finger being pressed against a fingerprint scanner, where the user's finger has a user's fingerprint that includes fingerprint ridges that form fingerprint grooves on the user's fingerprint. A light source on a rotating platform transmits offset light against the user's finger as the light source rotates on the rotating platform. A camera captures shadow images of shadows in the fingerprint grooves on the user's fingerprint. One or more processors receive and analyze the shadow images in order to determine a shape and depth of the fingerprint grooves on the user's fingerprint. The processor(s) generate a digital fingerprint file that represents the shape and depth of the fingerprint grooves on the user's fingerprint, and then store the digital fingerprint file for use in future biometric verification of the user.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In the prior art, fingerprints are recorded by using a traditional linear scanner that scans fingerprints when pressed upon a glass surface. However, such systems only capture a flat print pattern of the finger, and not the height of ridges and depth of resulting grooves that create the fingerprint pattern. As such, fingerprint scanners can be "fooled" by simply placing a photocopy of a user's fingerprint pattern against the fingerprint scanner.

However, the present invention, upon recognizing a capacitive touch (e.g., pressure by the user's finger/hand against the fingerprint scanner) and passing a temperature threshold (indicative of human body temperature), creates a signature of the user's finger that captures the print pattern itself as well as the depth of each groove in the fingerprint of the user's finger(s).

As described herein, one or more embodiments of the present invention utilize a light source and/or camera that is moved by rails and captures fingerprint groove depths based on image contrast and reference points obtained from multiple image frames as the light and/or camera rotate. As described herein, the present invention may utilize contrast lighting, a controlled environment, and a single image capture device on a mechanized rail to capture multiple reference points (angled light casted shadow+highlights) to calculate the depth of fingerprint grooves created by fingerprint ridges.

Thus, one or more embodiments of the present invention create a three dimensional (3D) image of a person's fingerprint by capturing 3D related datapoints (ridges, depth, etc.), which may or may not be utilized to recreate (at a later time) a two-dimensional (2D) rolled-fingerprint.

As described herein, one or more embodiments of the present invention use a moving light and a fixed camera to capture multiple perspectives of the finger, in order to create a multi-perspective representation of the fingerprint's grooves by calculating the points between the darkest and lightest parts (which is artificially created by the moving light) of multiple images.

In one or more embodiments of the present invention, any external light is blocked by a hardware enclosure/external design and the entrance, into which the user's finger is placed, and which may be constructed of rubber material with bristle backing to block any ambient light.

The depth of the fingerprint grooves and the actual print pattern are captured in multiple perspectives by a motorized variable angle light source rotating around the finger while a fixed (or moving) camera captures the events. In one or more embodiments of the present invention, the steps of rotating the light and/or camera while capturing images of the fingerprint are performed multiple times (e.g., three times), in order to normalize the captured data. For example, the camera could create a total of 120 frames that will capture different highlights and contrast of the grooves generated by the moving light. The images captured can be processed via software to enhance the differentiation of the cast shadow and its captured depth.

Each frame contains a different light perspective of the finger, which can be used as a reference point to calculate the depth of the grooves.

After the images of the finger are captured, a signature is created that is transported to the user's computer to be used for any purpose (e.g., security). In one embodiment, any data that is stored in the fingerprint scanner (e.g., the computer associated with the scanner) is deleted/removed.

Thus, in one or more embodiments of the present invention, 1) a user places his/her finger on a scanning surface; 2) the scanner is commanded manually by a user (or is automatically configured) to scan the finger when the finger is relatively fixed (with respect to a light source and/or camera) in an idle position; 3) a motorized sensor and light module are positioned to the center of the finger by a linear motor, rail, and rail guides; 4) a light source (e.g., a light emitting diode—LED) will turn on and be positioned to capture the optimum shadow depth and contrast points of the finger; 5) the camera travels along a circular rail in order to rotate around the finger multiple times (e.g., three) in order to enable the normalization of data, where the camera will capture high-resolution images (e.g., 120 frames) for the digit (e.g., finger) placed on the scanning surface while the motorized sensor and light are moving around the finger; 6) the photographed frames are processed using image filtering technology (e.g., black and white threshold algorithms); 7) the multiple images (e.g., 120 frames) that are captured are used to create a multiple light perspective representation of the finger as a video file, such that the angled position of the light and the fixed camera will capture the depth of the grooves on the fingerprint; 8) all of the captured data are compiled into a signature that the device can reference back to when the same finger is scanned at a later time; 9) the captured data/signature is transported via a data tunnel (e.g., a universal serial bus—USB port) to the user's computer with a success message; and/or 10) all captured data is cleared from the scanner.

Figure 1:
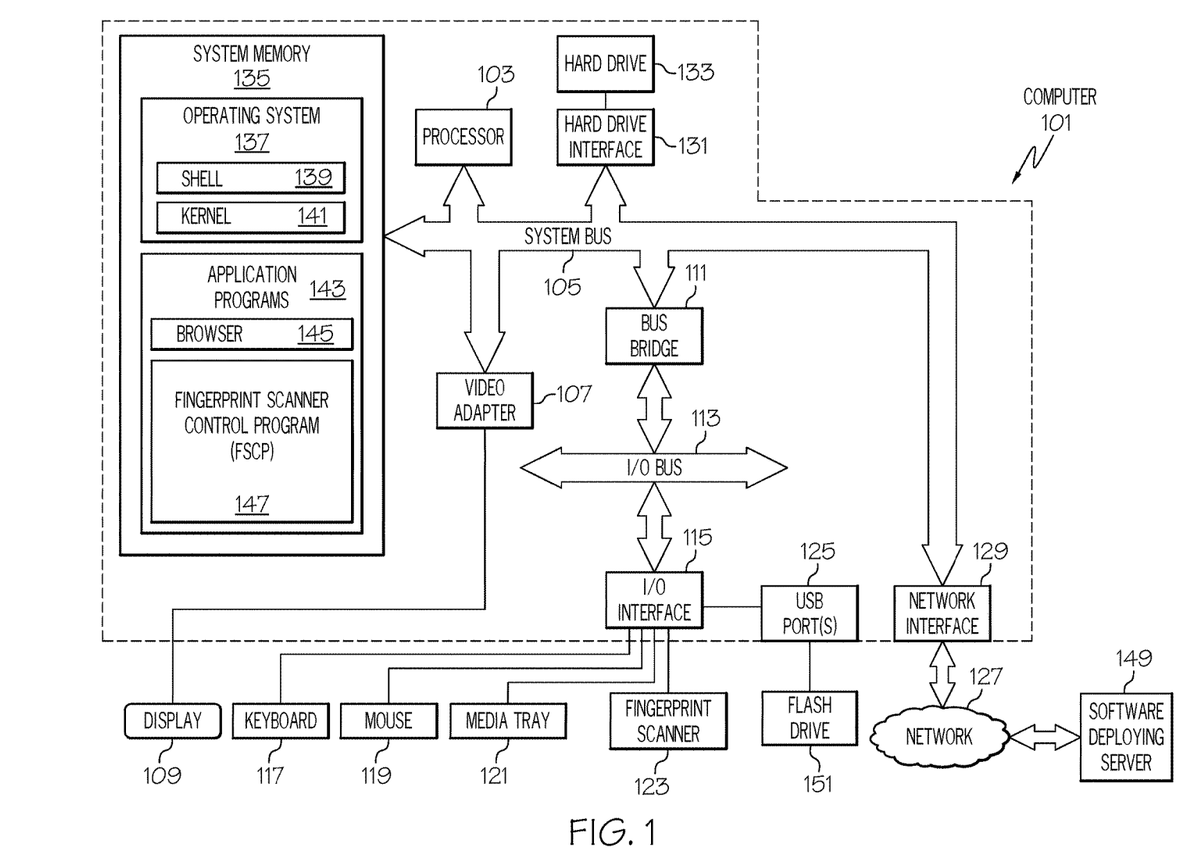
FIG. 1 depicts an exemplary system and network in which the present disclosure may be implemented.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by fingerprint scanner 123 and/or software deploying server 149 shown in FIG. 1.

Exemplary computer 101 includes a processor 103 that is coupled to a system bus 105. Processor 103 may utilize one or more processors, each of which has one or more processor cores. A video adapter 107, which drives/supports a display 109 (which may be a touch-screen display capable of detecting touch inputs onto the display 109), is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multimedia interfaces, etc.), and external USB port(s) 125. While the format of the ports connected to I/O interface 115 may be any known to those skilled in the art of computer architecture, in one embodiment some or all of these ports are universal serial bus (USB) ports.

In an embodiment, a removable storage device such as the depicted flash drive 151 may be removably inserted into one of the USB port(s) 125.

Figure 5:
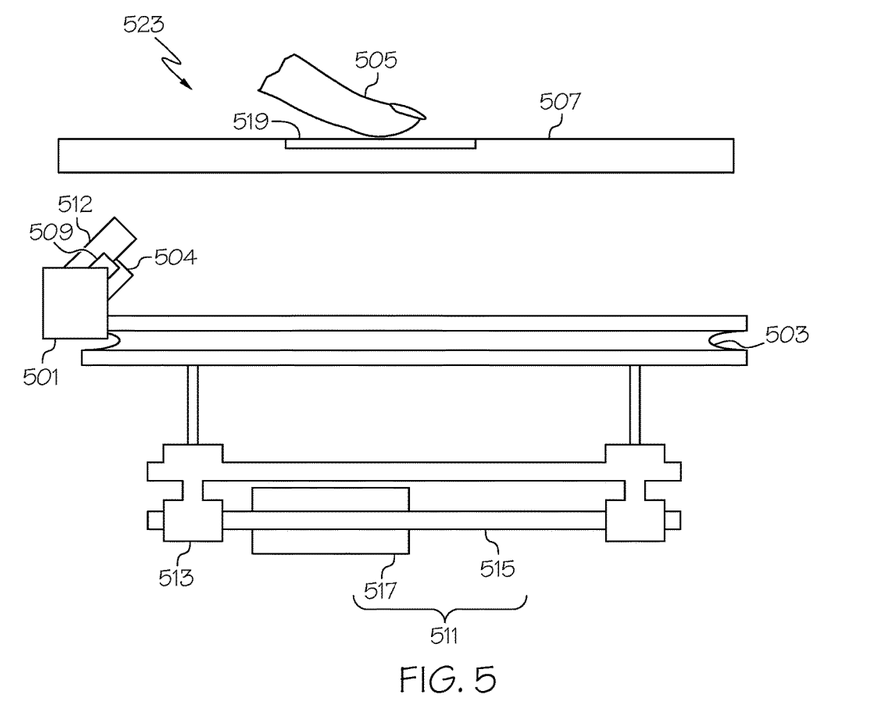
FIG. 5 depicts a side view of a novel fingerprint scanner in accordance with one or more embodiments of the present invention.
Figure 6:
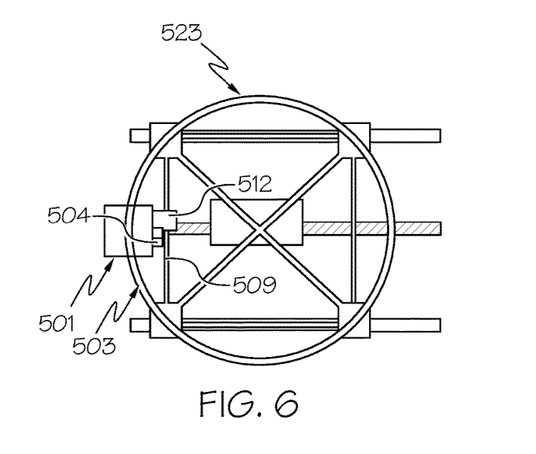
FIG. 6 illustrates a top view of the fingerprint scanner depicted in FIG. 5.

Also coupled to I/O interface 115 is a fingerprint scanner 123, which in one or more embodiments of the present invention is a fingerprint scanner, such as that described in detail in FIGS. 5-6.

As depicted, computer 101 is able to communicate with a software deploying server 149 and/or other devices/systems (e.g., fingerprint scanner 123) using a network interface 129.

Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include a Fingerprint Scanner Control Program (FSCP) 147. FSCP 147 includes code for implementing the processes described below, including those described in FIGS. 2-7. In one embodiment, computer 101 is able to download FSCP 147 from software deploying server 149, including in an on-demand basis, wherein the code in FSCP 147 is not downloaded until needed for execution. In one embodiment of the present invention, software deploying server 149 performs all of the functions associated with the present invention (including execution of FSCP 147), thus freeing computer 101 from having to use its own internal computing resources to execute FSCP 147.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like.

These and other variations are intended to be within the spirit and scope of the present invention.

Figure 2:
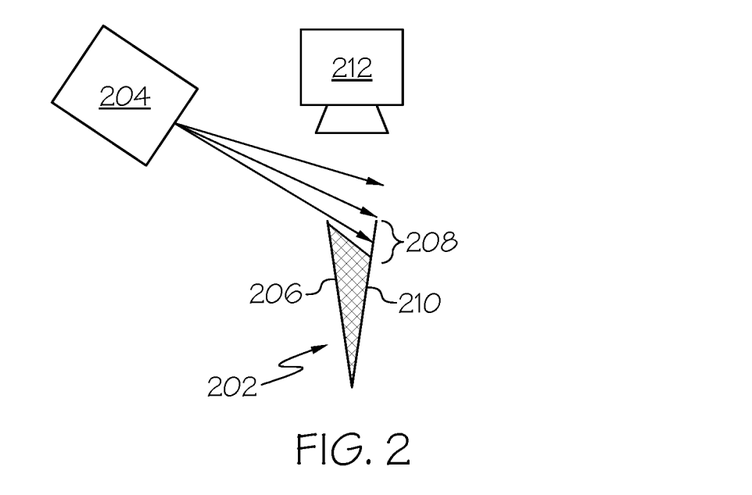
FIGS. 2-4 illustrate shadow variations on a single fingerprint groove from a user's fingerprint as a light source is moved around a user's finger whose fingerprint is being scanned in accordance with one or more embodiments of the present invention.
Figure 3:
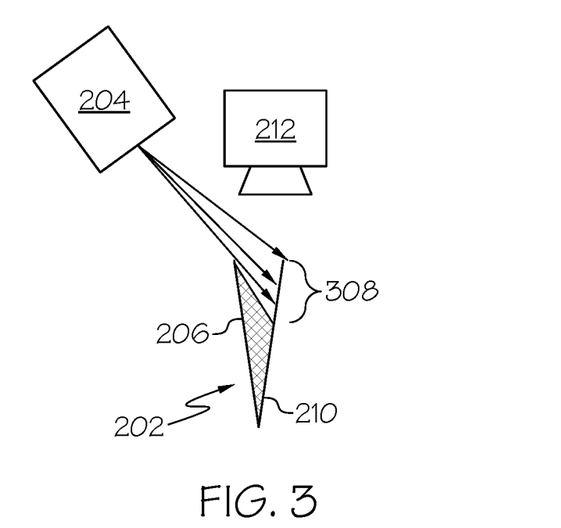
Figure 4:
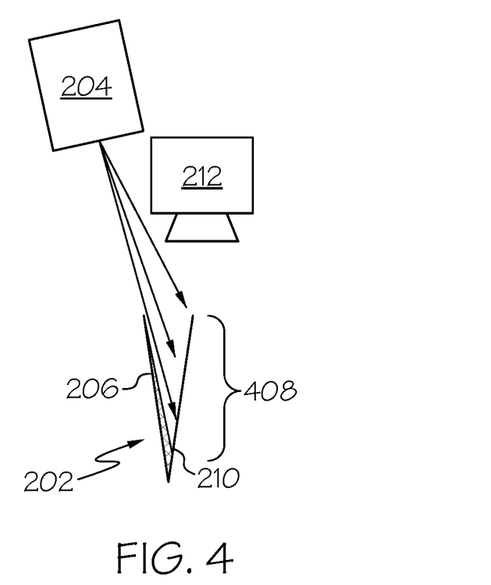

With referenced now to FIGS. 2-4, shadow variations are depicted on a single fingerprint groove from a user's fingerprint as a light source is moved around a user's finger whose fingerprint is being scanned in accordance with one or more embodiments of the present invention. For example, consider groove 202, which is part of a user's fingerprint. That is, a fingerprint is created when multiple ridges create multiple grooves in a person's finger. These ridges/grooves create unique patterns of loops, whorls, and arches that are unique to each person. In the context of one or more embodiments of the present invention, any such unique skin pattern, whether from the skin of a finger, a thumb, a palm, a toe, a foot sole, a foot heel, etc., is referred to as a "fingerprint".

Assume for purposes of illustration that groove 202 has an elongated channel shape (i.e., is not just a circular dip). Assume further that a light source 204 (e.g., a light emitting diode—LED) rotates about the groove 202. As such, when the light source 204 is shining over a first ridge 206 of the groove 202 but essentially perpendicular to the first ridge 206, only a small amount of the light from the light source 204 is able to enter/illuminate the interior of the groove 202. That is, the light only strikes a portion 208 of a second ridge 210 of the groove 202. This light (and the resulting darkness within the groove 202) is captured by a camera 212 that looks into the groove 202.

Since the groove 202 has an elongated shape, as the light source 204 revolves about the groove 202 (and thus becomes less perpendicular to the first ridge 206), more light is able to enter the groove 202, as illustrated by the portion 308 of the second ridge 210 that is illuminated in FIG. 3.

As the light source 204 revolves even further (e.g., such that light fully shines into the elongated shape of the groove 202), as shown in FIG. 4, then light is able to illuminate the portion 408 of the second ridge 210, thereby illuminating nearly all of the interior of the groove 202.

The changes in size of illuminated portions 208, 308, and 408 of groove 202 as light source 204 revolves around the groove 202, along with the exact angular (i.e., offset) position and distance of the light source 204 from the groove 202, are then used to calculate the shape and depth of the groove 202. That is, different variations in the sizes of portions 208, 308, and 408 are known to be associated with certain depths and shapes of grooves in a person's fingerprint.

With reference now to FIGS. 5-6, a side view of a novel fingerprint scanner 523 (analogous to fingerprint scanner 123 shown in FIG. 1) is illustrated in accordance with one or more embodiments of the present invention.

Fingerprint scanner 523 has a camera 512 (analogous to camera 212 shown in FIG. 2) and a light 504 (analogous to light source 204 shown in FIG. 2). Light 504 is mounted on a revolution motor 501, which travels around a circular track 503 (i.e., a rotating platform that supports the light 504 and/or other devices such as camera 512). Alternatively, the revolution motor 501 can turn the circular track 503, to which the light 504 is affixed in a permanent position.

As described in FIGS. 2-4, as the light 504 revolves under a user's finger, the camera 512 is able to capture the amount of light that is shining into the grooves of the fingerprint of the user's finger 505. While the camera 512 is shown in FIG. 5 as being mounted to the revolution motor 501 (and thus is rotating along with the light 504 below the user's finger 505), in one embodiment of the present invention the camera 512 is affixed to a stationary mount (not shown), such that the light 504 revolves below the user's finger 505 but the camera 512 does not.

Thus, FIG. 6 shows the light 504 and/or camera 512 revolving in a circle via the circular track 503 that is below the user's finger 505.

Also part of the fingerprint scanner 523 in one or more embodiments is a thermometer 509, which may be mounted on the revolution motor 501 as depicted or preferably, in a different location away from the revolution motor 501 (such that the thermometer 509 does not pick up heat from the revolution motor 501). Thermometer 509 (which in one or more embodiments is capable of detecting remote thermal signals from the user's finger 505) provides the system with information confirming that the user's finger 505 is in fact from a living person, and is not merely a model (2D or 3D) of the user's finger 505 that is being used to circumvent the fingerprint scanner 523.

In order to ensure that the user's finger 505 is properly aligned over the circular track 503, a linear alignment mechanism 511 positions a support platform 513 for the circular track 503. Linear alignment mechanism 511 has a rotating worm shaft 515 that goes through a worm wheel housing 517. Worm wheel housing 517 is in a fixed position. Within worm wheel housing 517 is threading that causes the worm shaft 515 to move in a linear manner. Since the worm shaft 515 is affixed to the support platform 513, this causes the circular track 503 (and thus the light 504) to also move in a linear manner, in order to align the circular track 503 such that it is concentric to the center of the user's finger 505. This alignment may be made manually or automatically (e.g., by using pressure sensors (not shown) on the fingerprint scanner plate 507 that detect the position of the user's finger 505 as it is pressed against the fingerprint scanner plate 507).

Thus, as shown in FIG. 5, the fingerprint scanner 523 includes a fingerprint scanner plate 507, a rotating platform (e.g., circular track 503) aligned below the fingerprint scanner plate, a light 504 mounted on the rotating platform, a camera 512, one or more processors (either part of fingerprint scanner 523 (not shown in FIG. 5) or an associated computer 101 shown in FIG. 1), and a memory device (e.g., hard drive 133 and/or system memory 135 shown in FIG. 1). As described herein, the camera captures multiple images of shadows in grooves in a fingerprint of a user's finger that is pressed against the fingerprint scanner plate as the light moves on the rotating platform.

The presence of the user's finger 505 may be detected by one or more pressure sensors embedded within the fingerprint scanner plate 507 (e.g., pressure sensor 519) or by the camera 512 (capturing an image of, and thus the presence of, the user's finger 505).

The one or more processors then analyze the multiple images of the shadows in the grooves in the fingerprint to determine a depth and shape of the grooves in the fingerprint. The one or more processors generate an original digital fingerprint file that represents the shape and depth of the fingerprint grooves on the user's fingerprint, and then store the original digital fingerprint file for use in future biometric verification of the user.

Thereafter, the processor(s) may generate a subsequent fingerprint file in response to a subsequent pressing of the user's finger against the fingerprint scanner plate. That is, once the authentic 3D fingerprint (i.e., that includes the shape and depth of the fingerprint grooves) is created, it will be used to authenticate future 3D fingerprints. Thus, if a subsequent finger is placed on the fingerprint scanner (e.g., to unlock a computer resource, to unlock a door, etc.), a determination is first made by a heat sensor (e.g., thermometer 509), which may be below the fingerprint scanner plate 507 as depicted or may be integrated into the fingerprint scanner plate 507, to detect biological heat from the user's finger. A comparator (e.g., one of the processors in the fingerprint scanner 523) then compares the subsequent digital fingerprint file (based on the new finger being pressed against the fingerprint scanner 523) to the original digital fingerprint file (created by the original finger). Thereafter, an authorization logic (e.g., the processor(s) within the fingerprint scanner 523) permits the user (who provided the second/matching fingerprint) to access a resource only in response to the heat sensor detecting the biological heat from the user's finger and only in response to the comparator matching the subsequent digital fingerprint file to the original digital fingerprint file.

Figure 7:
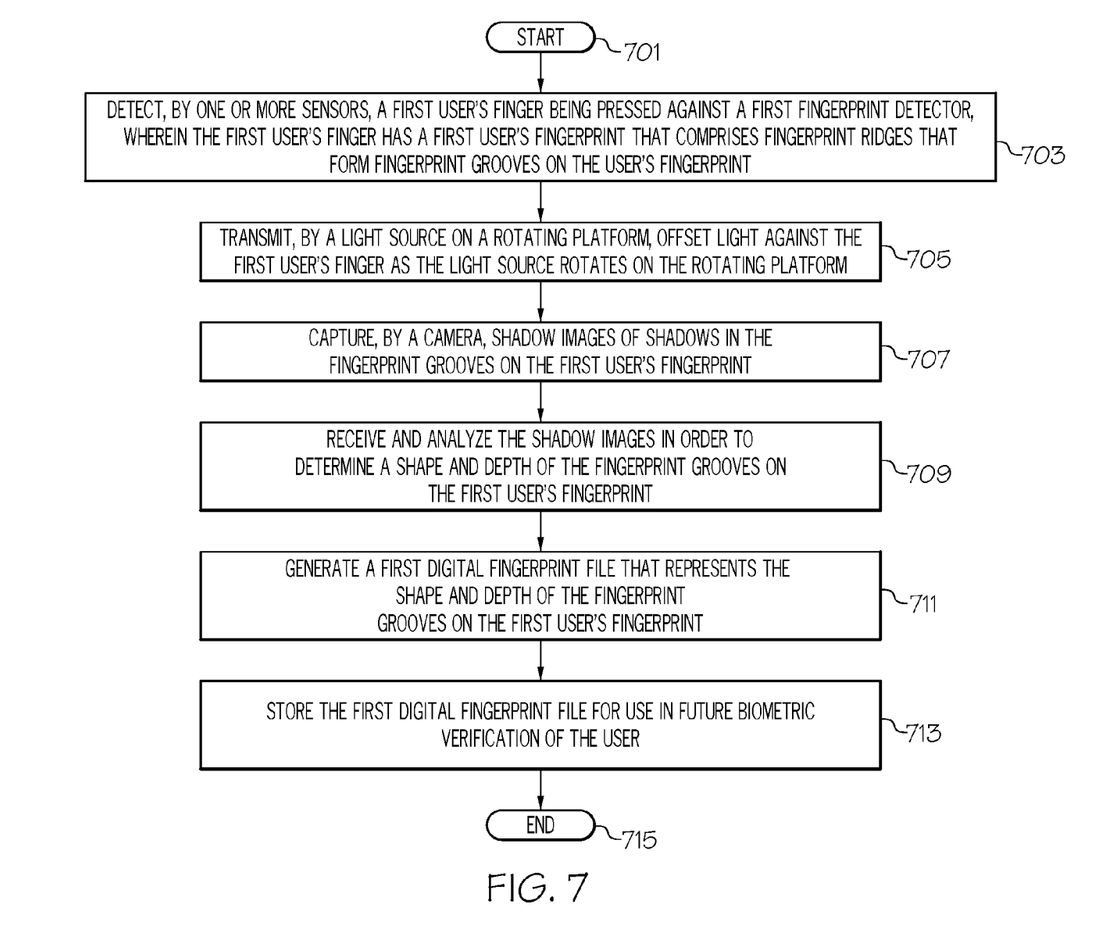
FIG. 7 is a high level flow chart of one or more steps performed by one or more processors and/or other hardware devices to create a three-dimensional (3D) image of a fingerprint.

With reference now to FIG. 7, a high level flow chart of one or more steps performed by one or more processors and/or other hardware devices to create a three-dimensional (3D) image of a fingerprint is presented.

After initiator block 701, one or more sensors (e.g., pressure sensor 519 and/or camera 512 shown in FIG. 5) detect a first user's finger (e.g., user's finger 505 shown in FIG. 5) being pressed against a first fingerprint scanner (e.g., fingerprint scanner 523), as described in block 703. The first user's finger has a first user's fingerprint that is formed by fingerprint ridges that create fingerprint grooves on the first user's fingerprint.

As described in block 705, a light source (e.g., an LED or other light source depicted in FIG. 5 as light 504) on a rotating platform (e.g., revolution motor 501 and/or circular track 503) transmits (shines) offset (e.g., at an angle, as shown in FIG. 5) light against the first user's finger as the light source rotates on the rotating platform.

As described in block 707, a camera (e.g., camera 512 shown in FIG. 5) captures shadow images of shadows in the fingerprint grooves on the first user's fingerprint (see FIGS. 2-4).

As described in block 709, one or more processors (e.g., within fingerprint scanner 523 or in the computer 101 shown in FIG. 1) receive and analyze the shadow images in order to determine a shape and depth of the fingerprint grooves on the first user's fingerprint.

As described in block 711, the processor(s) then generate a first digital fingerprint file that represents the shape and depth of the fingerprint grooves on the first user's fingerprint.

As described in block 713, the processor(s) then store (e.g., within the hard drive 133 or system memory 135 shown in FIG. 1, or in a remote location such as a cloud storage resource) the first digital fingerprint file for use in future biometric verification of the user.

The flow-chart ends at terminator block 715.

In an embodiment of the present invention, a linear alignment mechanism (e.g., linear alignment mechanism 511 shown in FIG. 5) aligns the support platform 513 (and thus the attached circular track 503) below a center of the user's finger, in order to align the user's finger with the light/camera.

As discussed herein, the 3D information about the user's fingerprint can then be used to verify that this same user is attempting to use a fingerprint scanner (e.g., to gain access to a computer resource, to open a phone, to open a door, to turn on a valve in a chemical plant, etc.). This fingerprint scanner may be the same fingerprint scanner that was used to created the 3D fingerprint file, or it may be another fingerprint scanner (assuming that the other fingerprint scanner has access to the 3D fingerprint file). As such, the sensors (e.g., pressure sensor 519) on the same or other fingerprint scanner detect a second user's finger being pressed against a second fingerprint scanner (which may be the same as the first fingerprint scanner or may be a different fingerprint scanner). A heat sensor (e.g., thermometer 509 when associated with the second fingerprint scanner) detects body heat from the second user's finger. One or more processors (e.g., within the fingerprint scanner 523) generate a second digital fingerprint file that represents a shape and depth of fingerprint grooves on the second user's fingerprint; compare the first digital fingerprint file to the second digital fingerprint file; and in response to the first digital fingerprint file matching the second digital fingerprint file and in response to the heat sensor detecting the body heat from the second user's finger, determine that the first user and the second user are a same person.

In an embodiment of the present invention, in response to determining that the first user and the second user are the same person, enabling the same person to access a resource. For example, assume that the resource is protected by a mechanical lock. Such a resource may be a fluid (that is protected by an electromechanical lock on a pipeline), an object (e.g., items in a safe), a room (that is protected by a locked door), etc. Thus, if the two fingerprints match, these mechanical locks are unlocked in order to allow the user to access the resource. Similarly, the resource may be a computer resource (e.g., a memory, a storage device, a smart phone, a server, etc.), to which access is granted only if the two fingerprints match.

In an embodiment of the present invention, a flash drive (e.g., flash drive 151 when part of the fingerprint scanner) or other removable memory device holds a copy of the generated 3D fingerprint file (i.e., that has information describing the shape and depth of the fingerprint grooves on the first user's fingerprint). When a processor within the computer (e.g., computer 101) to which the fingerprint scanner 123 is coupled detects the fingerprint scanner 123 being removed from the computer 101 (or a processor within the fingerprint scanner 123 itself detects this decoupling from the computer 101), the first digital fingerprint file is cleared from any memory storage devices in the first fingerprint scanner.

In an embodiment of the present invention, the revolution motor 501 shown in FIG. 5 rotates the rotating platform (e.g., support platform 513) for more than a predefined number of revolutions. The linear alignment mechanism 511 repositions the rotating platform during the predefined number of revolutions, such that the camera 512 is able to capture images of the first user's fingerprint from multiple viewing angles that are created as the rotating platform is being repositioned by the linear alignment mechanism.

In an embodiment of the present invention, the camera 212 shown in FIG. 2 is stationary (such that only the light source moves), while in another embodiment the camera 512 rotates with the light on the rotating platform.

The present invention may be implemented in one or more embodiments using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
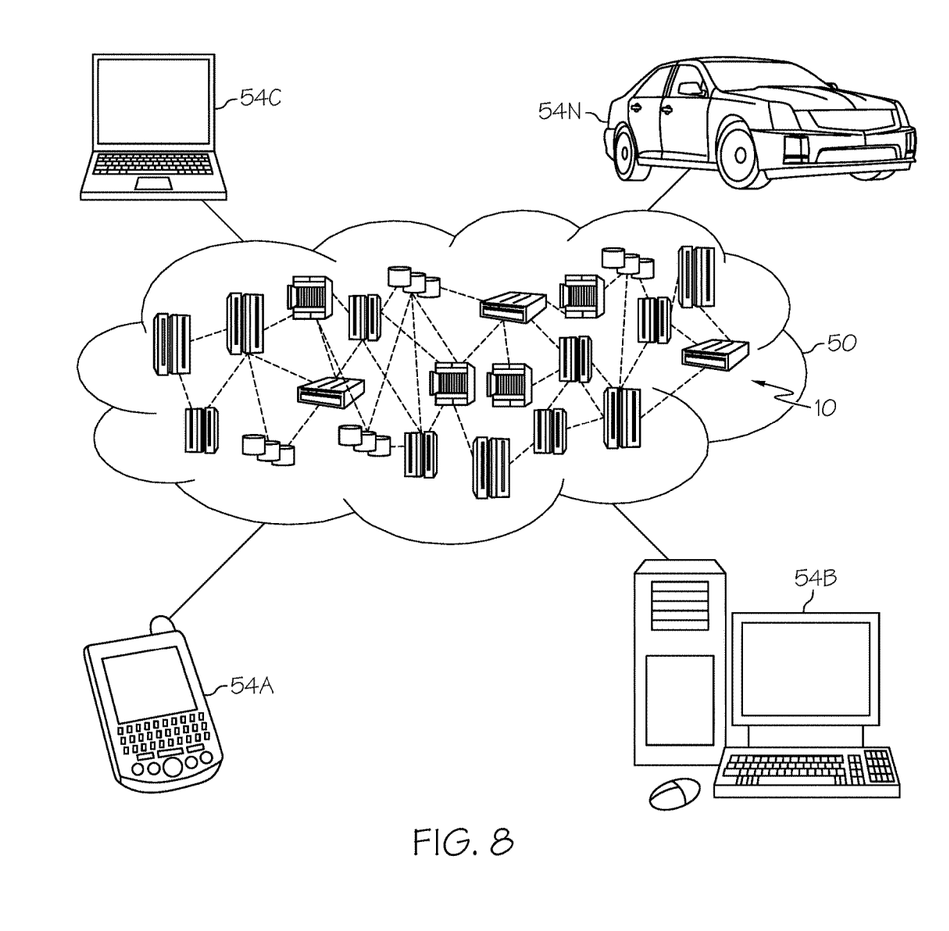
FIG. 8 depicts a cloud computing environment according to an embodiment of the present invention.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 8 are intended to be illustrative only and that computing nodes 10 and cloud computing environment 50 can communicate with any type of computerized device over any type of network and/or network addressable connection (e.g., using a web browser).

Figure 9:
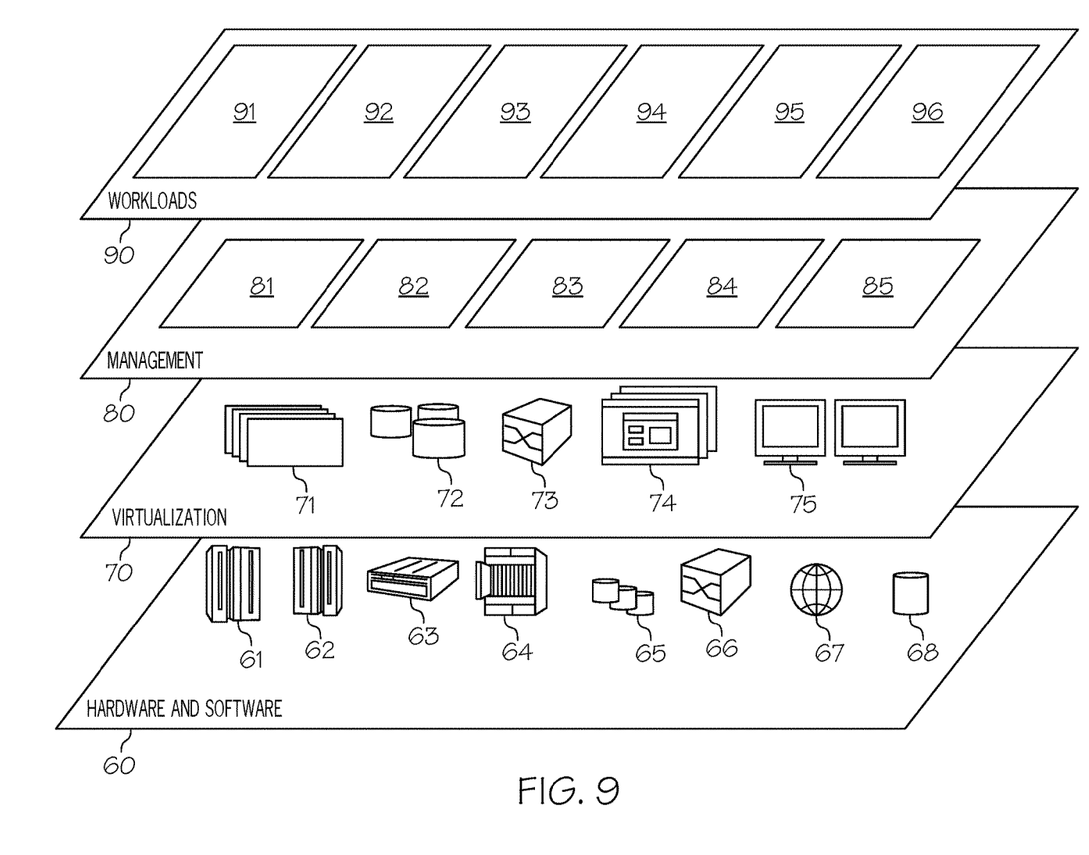
FIG. 9 depicts abstraction model layers of a cloud computer environment according to an embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and fingerprint scanner control processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
    detecting, by one or more sensors, a first user's finger being pressed against a first fingerprint scanner, wherein the first user's finger has a first user's fingerprint that comprises fingerprint ridges that form fingerprint grooves on the first user's fingerprint;
    transmitting, by a light source on a rotating platform, offset light against the first user's finger as the light source rotates on the rotating platform;
    capturing, by a camera, shadow images of shadows in the fingerprint grooves on the first user's fingerprint;
    receiving and analyzing, by one or more processors, the shadow images in order to determine a shape and depth of the fingerprint grooves on the first user's fingerprint;
    generating, by one or more processors, a first digital fingerprint file that represents the shape and depth of the fingerprint grooves on the first user's fingerprint;
    storing, by one or more processors, the first digital fingerprint file for use in future biometric verification of the first user;
    rotating, by a revolution motor, the rotating platform for more than a predefined number of revolutions;
    repositioning, by a linear alignment mechanism, the rotating platform during the predefined number of revolutions; and
    capturing, by the camera, images of the first user's fingerprint from multiple viewing angles that are created as the rotating platform is being repositioned by the linear alignment mechanism.

2. The method of claim 1, further comprising:
    aligning, by a linear alignment mechanism, a support platform below a center of the first user's finger, wherein the rotating platform is coupled to the support platform.

3. The method of claim 1, further comprising:
    detecting, by the one or more sensors, a second user's finger being pressed against a second fingerprint scanner;
    detecting, by a heat sensor, body heat from the second user's finger;
    generating, by one or more processors, a second digital fingerprint file that represents a shape and depth of fingerprint grooves on a second user's fingerprint;
    comparing, by one or more processors, the first digital fingerprint file to the second digital fingerprint file; and
    in response to the first digital fingerprint file matching the second digital fingerprint file and in response to the heat sensor detecting the body heat from the second user's finger, determining, by one or more processors, that the first user and the second user are a same person.

4. The method of claim 3, further comprising:
    in response to determining that the first user and the second user are the same person, enabling the same person to access a resource.

5. The method of claim 4, wherein the resource is protected by a mechanical lock that is unlocked in response to determining that the first user and the second user are the same person.

6. The method of claim 4, wherein the resource is protected by software that is unlocked in response to determining that the first user and the second user are the same person.

7. The method of claim 1, further comprising:
storing, by one or more processors, the first digital fingerprint file in a removable memory device that is coupled to the first fingerprint scanner;
detecting, by one or more processors, that the removable memory device has been removed from the first fingerprint scanner; and
in response to detecting that the removable memory device has been removed from the first fingerprint scanner, clearing the first digital fingerprint file from any memory storage devices in the first fingerprint scanner.

8. The method of claim 1, wherein the light source produces monochromatic light.

9. The method of claim 1, wherein the camera is stationary.

10. The method of claim 1, wherein the camera rotates with the light source on the rotating platform.

11. The method of claim 1, wherein the shadows in the fingerprint grooves are formed by light from the light source being blocked by the fingerprint ridges.

12. A computer system comprising one or more processors, one or more computer readable memories, and one or more computer readable storage mediums, and program instructions stored on at least one of the one or more storage mediums for execution by at least one of the one or more processors via at least one of the one or more memories, the stored program instructions comprising:
program instructions to detect, using sensor readings from one or more sensors, a first user's finger being pressed against a first fingerprint scanner, wherein the first user's finger has a first user's fingerprint that comprises fingerprint ridges that form fingerprint grooves on the first user's fingerprint;
program instructions to direct a light source on a rotating platform to transmit offset light against the first user's finger as the light source rotates on the rotating platform;
program instructions to direct a camera to capture shadow images of shadows in the fingerprint grooves on the first user's fingerprint;
program instructions to receive and analyze the shadow images in order to determine a shape and depth of the fingerprint grooves on the first user's fingerprint;
program instructions to generate a first digital fingerprint file that represents the shape and depth of the fingerprint grooves on the first user's fingerprint;
program instructions to store the first digital fingerprint file for use in future biometric verification of the first user;
program instructions to store the first digital fingerprint file in a removable memory device that is coupled to the first fingerprint scanner;
program instructions to detect that the removable memory device has been removed from the first fingerprint scanner; and
program instructions to, in response to detecting that the removable memory device has been removed from the computer, clear the first digital fingerprint file from any memory storage devices in the first fingerprint scanner.

13. The computer system of claim 12, further comprising:
program instructions to detect, based on sensor readings by the one or more sensors, a second user's finger being pressed against a second fingerprint scanner;
program instructions to detect, based on sensor readings from a heat sensor, body heat from the second user's finger;
program instructions to generate a second digital fingerprint file that represents a shape and depth of fingerprint grooves on a second user's fingerprint;
program instructions to compare the first digital fingerprint file to the second digital fingerprint file; and
program instructions to, in response to the first digital fingerprint file matching the second digital fingerprint file and in response to the heat sensor detecting the body heat from the second user's finger, determine that the first user and the second user are a same person.

14. The computer system of claim 13, further comprising:
program instructions to, in response to determining that the first user and the second user are the same person, enable the same person to access a resource, wherein the resource is protected by a mechanical lock that is unlocked in response to determining that the first user and the second user are the same person.

15. The computer system of claim 13, further comprising:
program instructions to, in response to determining that the first user and the second user are the same person, enable the same person to access a resource, wherein the resource is protected by software that is unlocked in response to determining that the first user and the second user are the same person.

16. The computer system of claim 12, further comprising:
program instructions to direct a revolution motor to rotate the rotating platform for more than a predefined number of revolutions;
program instructions to direct a linear alignment mechanism to reposition the rotating platform during the predefined number of revolutions; and
program instructions to direct the camera to capture images of the first user's fingerprint from multiple viewing angles that are created as the rotating platform is being repositioned by the linear alignment mechanism.

17. A method comprising:
detecting, by one or more sensors, a first user's finger being pressed against a first fingerprint scanner, wherein the first user's finger has a first user's fingerprint that comprises fingerprint ridges that form fingerprint grooves on the first user's fingerprint;
transmitting, by a light source on a rotating platform, offset light against the first user's finger as the light source rotates on the rotating platform;
capturing, by a camera, shadow images of shadows in the fingerprint grooves on the first user's fingerprint;
receiving and analyzing, by one or more processors, the shadow images in order to determine a shape and depth of the fingerprint grooves on the first user's fingerprint;
generating, by one or more processors, a first digital fingerprint file that represents the shape and depth of the fingerprint grooves on the first user's fingerprint;
storing, by one or more processors, the first digital fingerprint file for use in future biometric verification of the first user;
storing, by one or more processors, the first digital fingerprint file in a removable memory device that is coupled to the first fingerprint scanner;

detecting, by one or more processors, that the removable memory device has been removed from the first fingerprint scanner; and in response to detecting that the removable memory device has been removed from the first fingerprint scanner, clearing the first digital fingerprint file from any memory storage devices in the first fingerprint scanner.

\* \* \* \* \*